US012475753B1

(12) United States Patent
Thiesen et al.

(10) Patent No.: US 12,475,753 B1
(45) Date of Patent: Nov. 18, 2025

(54) MESSAGE ENCODING FOR WEAPON COMMUNICATIONS

(71) Applicant: Biofire Technologies Inc., Broomfield, CO (US)

(72) Inventors: Jack Hugo Thiesen, Firestone, CO (US); Kai Thorin Kloepfer, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 18/813,431

(22) Filed: Aug. 23, 2024

Related U.S. Application Data

(63) Continuation of application No. 17/931,247, filed on Sep. 12, 2022, now Pat. No. 12,080,118.

(60) Provisional application No. 63/242,844, filed on Sep. 10, 2021.

(51) Int. Cl.
*F41A 17/06* (2006.01)
*G07C 9/37* (2020.01)

(52) U.S. Cl.
CPC ............. *G07C 9/37* (2020.01); *F41A 17/066* (2013.01)

(58) Field of Classification Search
CPC .................................. G07C 9/37; F41A 17/066
See application file for complete search history.

(56) References Cited

U.S. PATENT DOCUMENTS

| 5,742,678 | A | * | 4/1998 | Dent | H04J 13/00 |
| | | | | | 370/335 |
| 7,200,965 | B2 | | 4/2007 | Vor et al. | |
| 8,037,632 | B2 | | 10/2011 | Pikielny | |
| 8,322,329 | B1 | * | 12/2012 | Sikes | F41B 11/723 |
| | | | | | 124/73 |
| 2005/0011103 | A1 | | 1/2005 | Cederwall | |
| 2007/0021220 | A1 | * | 1/2007 | Rohm | F41G 3/2666 |
| | | | | | 463/51 |
| 2008/0108021 | A1 | | 5/2008 | Slayton et al. | |
| 2008/0121097 | A1 | | 5/2008 | Rudakevych et al. | |
| 2013/0019510 | A1 | | 1/2013 | Kemmerer et al. | |

(Continued)

FOREIGN PATENT DOCUMENTS

CA 2656995 C * 7/2012 ............... F41G 3/26

*Primary Examiner* — Tuyen K Vo
(74) *Attorney, Agent, or Firm* — Perkins Coie LLP; Andrew T. Pettit

(57) ABSTRACT

The present disclosure provides systems and techniques for communicating across electronic components of a device. The device may be a gun, and the device may encode messages to improve the security of the device. The device may obtain a first spreading code, encode, at a first electronic component, a first message according to the first spreading code to produce a first encoded message, transmit the first encoded message from the first electronic component to a second electronic component across a physical communication channel, decode, at the second electronic component, the first encoded message according to the first spreading code, and perform a first action in response to the decoding the first encoded message. The first action may include discharging electric charge from a capacitor bank, charging the capacitor bank, firing a projectile, arming the device, disarming the device, or transmitting data across an additional communication channel.

16 Claims, 14 Drawing Sheets

(56) References Cited

U.S. PATENT DOCUMENTS

2013/0125441 A1 5/2013 Westwood et al.
2016/0171827 A1\* 6/2016 Washington ........ G07F 17/3227
                                                        463/16

\* cited by examiner

FIG. 6

MESSAGE ENCODING FOR WEAPON COMMUNICATIONS

CROSS-REFERENCE TO RELATED APPLICATIONS

This application is a continuation of U.S. patent application Ser. No. 17/931,247, titled "MESSAGE ENCODING FOR WEAPON COMMUNICATIONS" and filed on Sep. 12, 2022, now U.S. Pat. No. 12,080,118, which claims priority to U.S. Provisional Application No. 63/242,844, titled "MESSAGE ENCODING FOR WEAPON COMMUNICATIONS" and filed on Sep. 10, 2021, which are incorporated by reference herein in their entireties.

FIELD OF TECHNOLOGY

The teachings disclosed herein generally relate to guns, and more specifically to encoding messages for weapon communications.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support encoding and decoding messages to improve data security. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the systems and techniques described herein provide for communicating across electronic components, such as electronic components located within a gun. An electronic component of a gun may encode a message according to a spreading code to produce an encoded message, and the electronic component may transmit the encoded message to an additional electronic component of the gun over a communication channel. The additional electronic component may decode the encoded message according to the spreading code to produce the message.

For example, a first electronic component of a gun and a second electronic component of the gun may obtain a first spreading code. The first electronic component may encode a first message according to the first spreading code to produce a first encoded message and transmit the first encoded message to the second electronic component across a physical communication channel. The second electronic component may decode the first encoded message according to the first spreading code. The gun may perform a first action in response to the second electronic component decoding the first encoded message. The first action may include discharging electric charge from a capacitor bank, charging the capacitor bank, firing a projectile, arming the device, disarming the device, or transmitting data across an additional communication channel.

BRIEF DESCRIPTION OF THE DRAWINGS

FIG. 6 illustrates examples of techniques for encoding and decoding messages.

Figure 1:
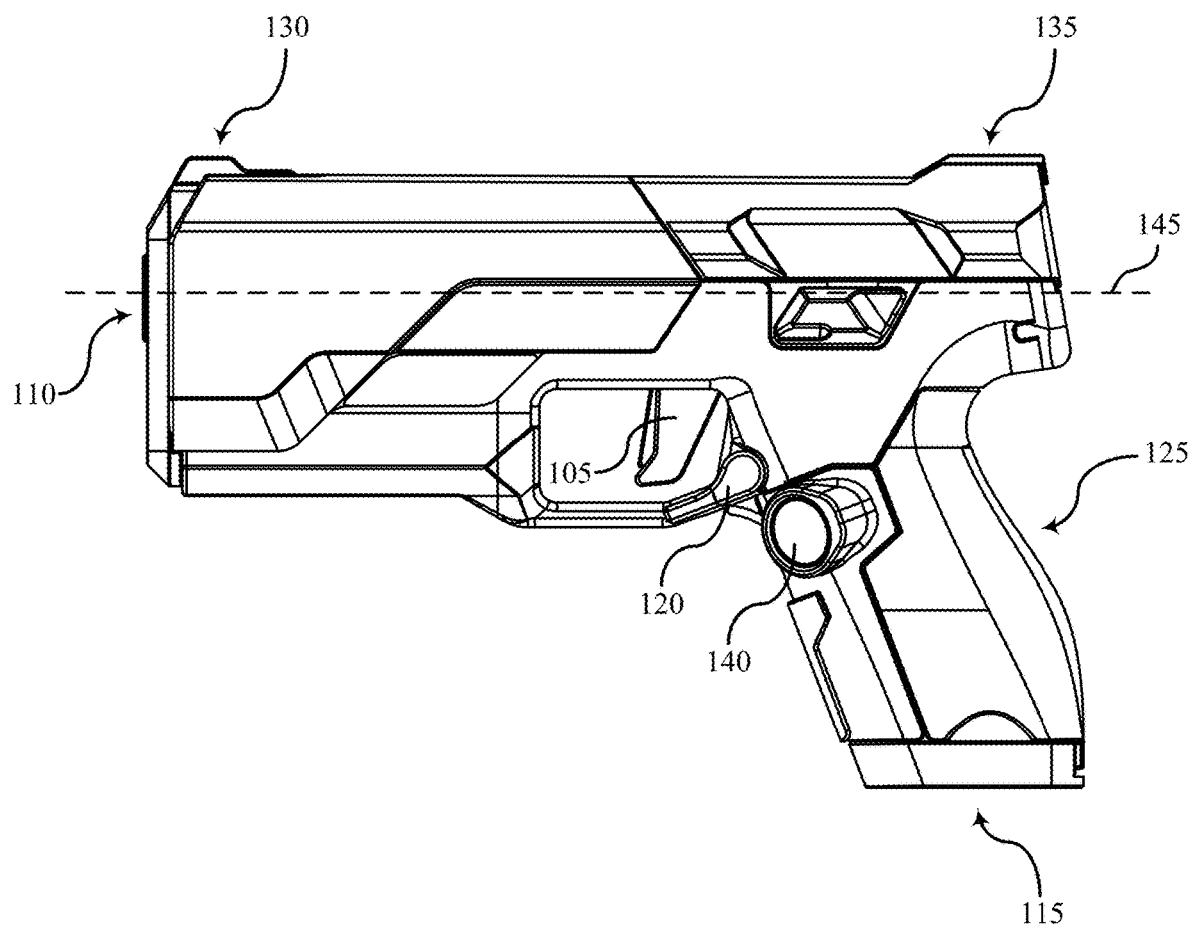
FIG. 1 illustrates an example of a gun that supports encoding messages for communicating between electronic components.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional weapons include electrical components, such as processors, circuits (e.g., for wireless communication), field-programmable gate arrays (FPGAs), application-specific integrated circuits (ASICS), and the like, that support transmitting and/or receiving messages. A weapon may perform an action (e.g., fire a projectile) in response to an electronic component of the weapon receiving a message. Similarly, a weapon may transmit a message in response to performing an action (e.g., firing a projectile). Conventional weapons generally receive and/or transmit messages in an unencoded, unencrypted, or otherwise transparent format. However, transparent messages may reduce weapon security, as some weapons may be fired, activated, or armed in response to receiving a transparent message at an electronic component, and a nefarious user may spoof the transparent message to achieve weapon functionality. For example, the nefarious user may record the transparent message and spoof the message by replaying the recorded message to achieve weapon functionality. As such, conventional weapons provide inadequate security and allow nefarious users to achieve weapon functionality through message spoofing.

Introduced here, therefore, are systems and techniques for encoding messages. The messages may be transmitted between a transmitter and a receiver, such as a first electronic component and a second electronic component of a weapon or a gun. The systems and techniques described herein improve weapon security by not only mitigating the likelihood of message spoofing but also the likelihood of undesired access to data. As an example, the weapon may be an electromechanical gun that fires a projectile, or permits a projectile to be fired, in response to a message being transmitted from a first electronic component of the gun to a second electronic component of the gun. The systems and techniques described herein support encoding messages so as to prevent a nefarious user from spoofing the message and achieving weapon functionality.

The weapon may encode a message according to one or more spreading codes (e.g., keys, sequences, etc.), transmit the encoded message from a first electronic component of the weapon, and decode the message at a second electronic component of the weapon according to the one or more spreading codes. The weapon may perform an action (e.g., fire a projectile, remove a safety mechanism, etc.) based on the second electronic component successfully decoding the message that is encoded with the one or more spreading codes. Encoding a message (e.g., a fire signal, a trigger signal, etc.) according to one or more spreading codes improves weapon security, as the encoded message is opaque to observers lacking the one or more spreading codes used to encode the signal, thereby preventing nefarious users from spoofing the message.

A weapon may perform direct sequence spread spectrum (DSSS) operations for communicating across components, such as across a transmitter component (or simply "transmitter") and a receiver component (or simply "receiver") that are coupled via a communication channel (e.g., a physical communication channel, such as a communication bus, a digital or virtual communication channel, such as a frequency range, etc.). For example, the transmitter may encode a fire message according to a spreading code, and the receiver may decode the fire message based on the spreading code. The spreading code may be loaded into memory of the transmitter and the receiver, or the transmitter and the receiver may be synchronized and each generate the spreading code independently in accordance with a code generation scheme. Encoding messages within a weapon, such as a message used to initiate the firing of a projectile from the weapon, improves weapon security as the one or more spreading codes used to encode the message act as keys that transform messages into encoded messages that are opaque to actors (e.g., nefarious users) that lack the one or more spreading codes used to encode the messages.

Additionally, the weapon may perform dynamic message encoding where a first message (e.g., a first fire signal, an unlock signal, etc.) is encoded according to a first set of one or more spreading codes and a second message (e.g., a second fire signal, a subsequent fire signal, a lock signal, etc.) is encoded according to a second set of one or more spreading codes that is different from the first set of one or more spreading codes. Messages may also be transmitted according to a dynamic time offset scheme, as further described herein. Dynamic message encoding enhances weapon security, as different messages can be encoded according to different spreading codes, thereby blocking common attack vectors, such as man-in-the-middle attacks and replay attacks.

Embodiments may be described in the context of executable instructions for the purpose of illustration. For example, a processor housed in a gun may be described as being capable of executing instructions that permit the encoding of messages according to spreading codes. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports communicating across electronic components. A first electronic component may generate a message, encode the message according to a spreading code, and transmit the encoded message to a second electronic component. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly appliable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint scanner (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to describe data that is used to authenticate a user. For example, the gun 100 may collect authentication data from the user to determine that the user is authorized to operate the gun 100, and the gun 100 may be unlocked based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights-namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

As further discussed herein, the gun 100 (or components thereof) may encode messages to improve the security of the gun 100. The gun 100 may obtain a first spreading code. In some examples, the gun 100 may receive the first spreading code, while in some other examples, the gun 100 may generate the first spreading code. The gun 100 may encode, at a first electronic component, a first message according to the first spreading code to produce a first encoded message, transmit the first encoded message from the first electronic component to a second electronic component across a physical communication channel, decode, at the second electronic component, the first encoded message according to the first spreading code, and perform a first action in response to the decoding the first encoded message. The first action may include discharging electric charge from a capacitor bank, charging the capacitor bank, firing a projectile through the barrel 110, unlocking the gun 100, arming the gun 100, disarming the gun 100, locking the gun 100, or transmitting data across an additional communication channel.

Figure 2:
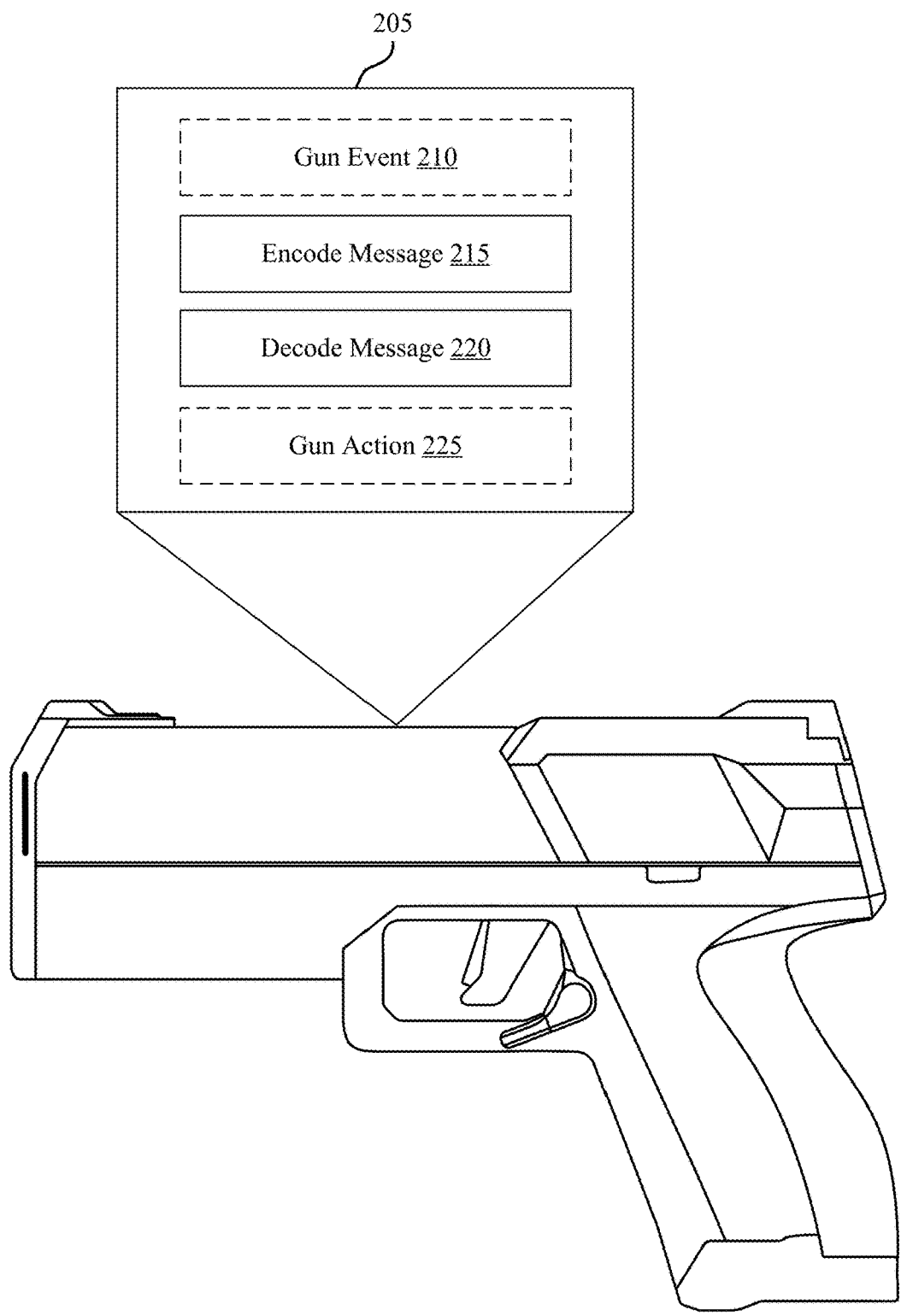
FIG. 2 illustrates an example of a communication procedure performed by a gun.

FIG. 2 illustrates an example of a gun 200 that is capable of performing a communication procedure 205. The communication procedure 205 may be performed by a weapon, such as an electromechanical gun. The communication procedure 205 may improve the security of the weapon and mitigate unintended operation of the weapon.

The actions of the communication procedure 205 may be performed by one or more components of the gun 200. One or more electronic components (e.g., a processor, a circuit, a transmitter, a receiver, a mask component, an FPGA, an ASIC, a digital signal processor (DSP), etc.) may perform aspects of the communication procedure 205. For example, an electronic component may identify the gun event at step 210 and encode a message at step 215. As another example, a first electronic component may identify the gun event at step 210 and a second electronic component may encode the message at step 215.

At step 210, the gun 200 may identify a gun event. As described herein, the gun event may include a mechanical event (e.g., a trigger break, loading a round into the chamber, etc.), an electrical event (e.g., activation of a user presence sensor, receiving biometric data from a biometric sensor, etc.), or a logical event (e.g., determining that a user is holding the gun, satisfying an authentication condition, etc.). The gun 200 may, in some examples, generate an output indicating that the gun event has been identified.

At step 215, the gun 200 may encode a message. In some examples, the gun 200 may encode the message based on the gun event. For example, in response to identifying a gun event at step 210, the gun 200 may encode a message according to one or more spreading codes at step 215. The gun 200 may transmit the encoded message from a first component (e.g., a transmitter, an encoder, a first FPGA, etc.) to a second component (e.g., a receiver, a decoder, a second FPGA, etc.). The first component and the second component may be coupled via a physical communication channel, such as a conductive wire, a bus, an Inter-Integrated Circuit (I2C), a Serial Peripheral Interface (SPI), or the like. The encoded message may be transmitted over the physical communication channel from the first component to the second component.

At step 220, the gun 200 may decode the message. The message may be encoded (e.g., spread) according to a spreading code, and the gun 200 may decode (e.g., despread) the message according to the spreading code that was used to encode the message. The first component (e.g., a transmitter) may apply a transformation function to the message based on the spreading code to produce the encoded message, and the second component (e.g., a receiver) may apply a transformation function to the encoded message based on the spreading code to produce the message. The message produced by the receiver may be the same as the original message or similar to the original message.

The transmitter and receiver may encode and decode messages according to a communication scheme, such as direct sequence spread spectrum, frequency hopping spread spectrum, or time hopping spread spectrum. The transmitter and receiver may each obtain spreading codes and use the spreading codes to encode and/or decode messages. The term "obtaining," as used herein in the context of spreading codes, may include "generating" spreading codes, "deriving" spreading codes, "retrieving" spreading codes, "acquiring" spreading codes, or the like. For example, spreading codes may be loaded into memory of the gun 200 during manufacturing and/or on a reoccurring basis, and an electronic component (e.g., a transmitter, a receiver, an FPGA, an ASIC, a processor, etc.) may retrieve a spreading code from the memory and apply the spreading code to a message to encode the message. The memory may be shared by the transmitter and receiver, or the transmitter and receiver may each be associated with separate memory. As another example, an electronic component may generate a spreading code based on a derivation function, and the transmitter and receiver may perform a synchronization procedure to synchronize spreading codes. A spreading code may be used to map each data bit in an unencoded message to multiple data bits in an encoded message. In some examples, the gun 200 may include multiple electronic components that communicate with encoded messages. In some other examples, the gun 200 may include an electronic component that communicates with an additional electronic component that is external to the gun 200.

At step 225, the gun 200 may perform one or more actions based on the decoded message. For example, in response to receiving and/or decoding the encoded message to produce the decoded message, the gun 200 may discharge electric charge from a capacitor bank, release a sear, fire a projectile (e.g., a bullet), arm a fire control system, charge the capacitor bank, disarm the fire control system, or transmit data across a communication channel.

Figure 3:
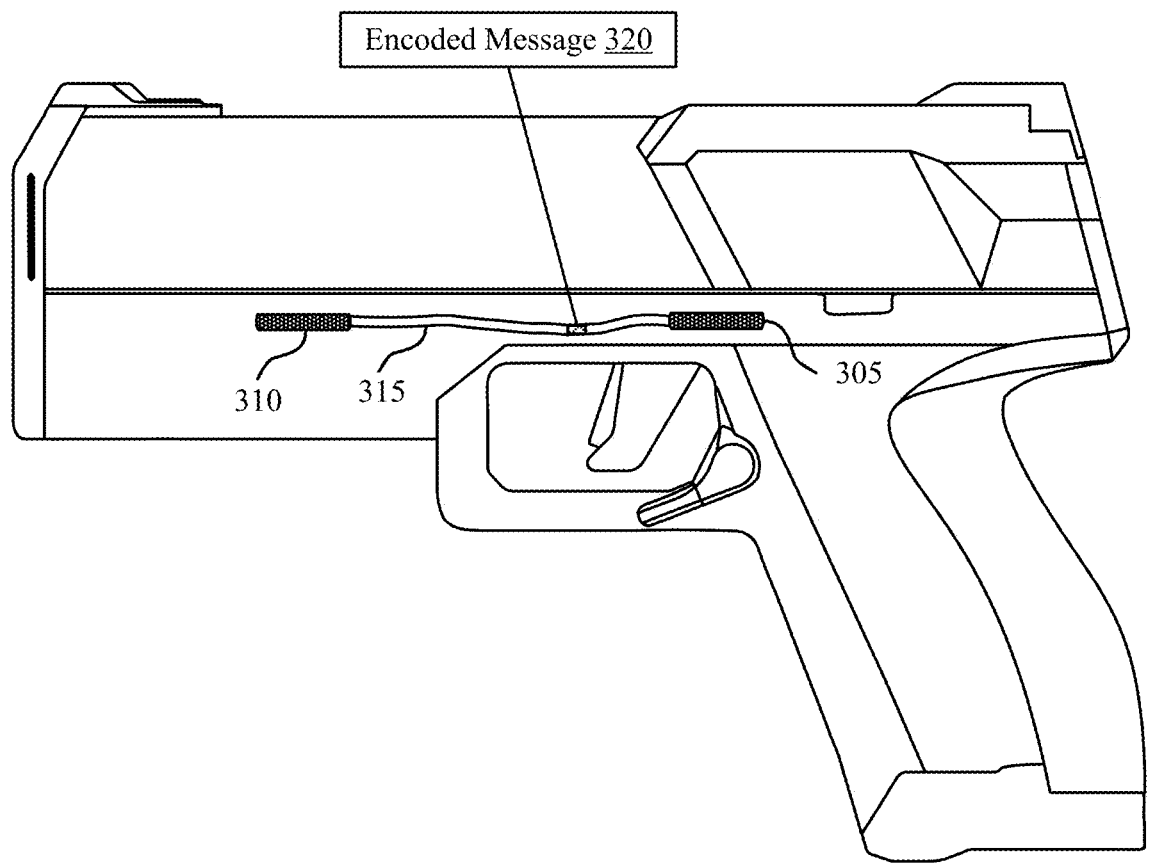
FIG. 3 illustrates an example of a gun transmitting an encoded message.

FIG. 3 illustrates an example of a gun 300 transmitting an encoded message 320. The gun 300 includes a transmitter 305 (e.g., a spreader, an encoder, a modulator, a masker, a first electronic component, a first FPGA, a first ASIC, etc.), a receiver 310 (e.g., a de-spreader, a decoder, a demodulator, a de-masker, a second electronic component, a second FPGA, a second ASIC,), and a physical communication channel 315 (e.g., a conductive wire, a bus, an SPI, an I2C, etc.). An electronic component may be considered a transmitter when transmitting an encoded message and a receiver when receiving an encoded message. In other words, an electronic component may act as a transmitter in some contexts and a receiver in other contexts. FIG. 3 illustrates the transmitter 305 transmitting the encoded message 320 over the physical communication channel 315 to the receiver 310.

The encoded message 320 may be encoded according to one or more spreading codes. In some examples, the transmitter 305 may transmit multiple encoded messages to the receiver 310 according to a time offset. For example, the transmitter 305 may transmit a first encoded message at a first time, wait a duration of time (e.g., 1 microsecond, 500 microseconds, or anywhere in between), and transmit a second encoded message such that the predetermined time offset is present between transmitting the first encoded message and the second encoded message. The first and second encoded messages may be encoded according to the same spreading code or according to different spreading codes. In some examples, the transmitter 305 may obtain a message, separate the message into multiple messages, encode each of the multiple messages, and transmit each of the encoded messages to the receiver 310.

As an illustrative example, a message corresponding to a fire signal may be encoded at the transmitter 305 according to a first spreading code to produce the encoded message 320. The encoded message 320 may be transmitted across the physical communication channel 315 to the receiver 310, and the receiver may decode the encoded message 320 according to the first spreading code. In some examples, the spreading code may include a sequence of random or pseudo random numbers (e.g., a stream cipher), and the message may be XOR'd with the spreading code to produce the encoded message 320. The "XOR" function is an example of a transformation function. The gun 300 may perform one or more actions (also referred to as "gun actions") in response to successfully decoding the encoded message 320. Examples of gun actions are further described herein, such as with reference to FIG. 5.

Figure 4:
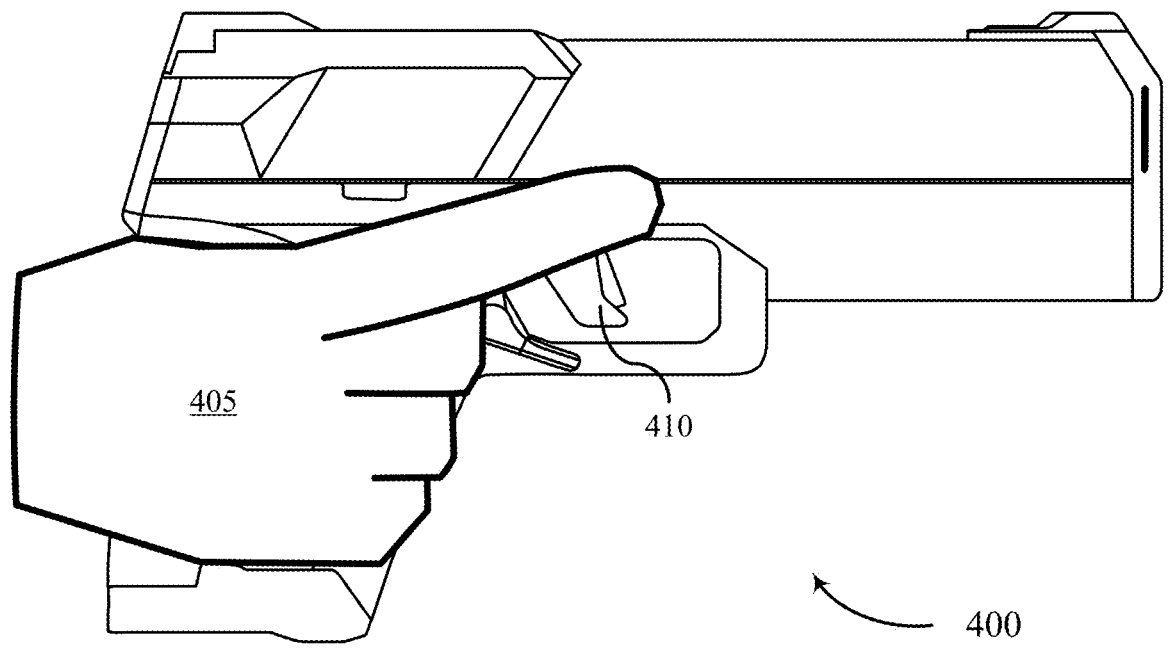
FIG. 4 illustrates an example of a gun that is being held by a user.

FIG. 4 illustrates an example of a gun 400 that is being held by a user 405. FIG. 4 illustrates an example of an event (also referred to as a "gun event"). Examples of gun events include the user 405 pulling the trigger 410, the user 405 picking up the gun 400, the user 405 putting down the gun 400, the user 405 requesting data (e.g., via a user interface (UI) of the gun 400 or a UI that is coupled with the gun 400), the user 405 providing user-input to the gun 400 (e.g., via a user interface or a button), an authentication procedure to determine whether the user 405 is authorized to operate the gun 400, initiation of a power up procedure, initiation of a power down procedure, or the like.

As an example, the gun 400 may perform an authentication procedure based on a sensor of the gun 400 receiving authentication data (e.g., a password, a Bluetooth token, radio frequency identification (RFID) data, near-field communication data, a fingerprint data, facial data, palm print data, a vein pattern data, etc.), and a transmitter located within the gun 400 may transmit an encoded message to a receiver located within the gun 400 in response to the authentication procedure generating an output indicating that the user 405 is authorized to operate the gun 400. The transmitter may transmit the encoded message based on the authentication procedure matching the received authentication data to authentication data stored in memory of the gun 400. The authentication data may be stored in encrypted and/or hashed form, and the received authentication data may be encrypted and/or hashed to determine whether the received authentication data corresponds to an approved user.

As another example, a sensor (e.g., an inertial measurement unit (IMU)) of the gun 400 may identify a gesture (e.g., a pickup gesture), and the transmitter may transmit the encoded message in response to the gesture. The encoded message may, for example, cause the gun 400 to perform a boot procedure and/or enter an armed state.

As yet another example, the gun 400 may determine that the user 405 is holding the gun 400 based on one or more user presence sensors (e.g., a capacitive sensor, a time-of-flight sensor, a pressure sensor, a mechanical switch, an optical sensor, a mechanical switch, a laser proximity sensor, an IMU, etc.), and the transmitter may transmit the encoded message in response to determining that the user 405 is holding the gun 400.

Figure 5:
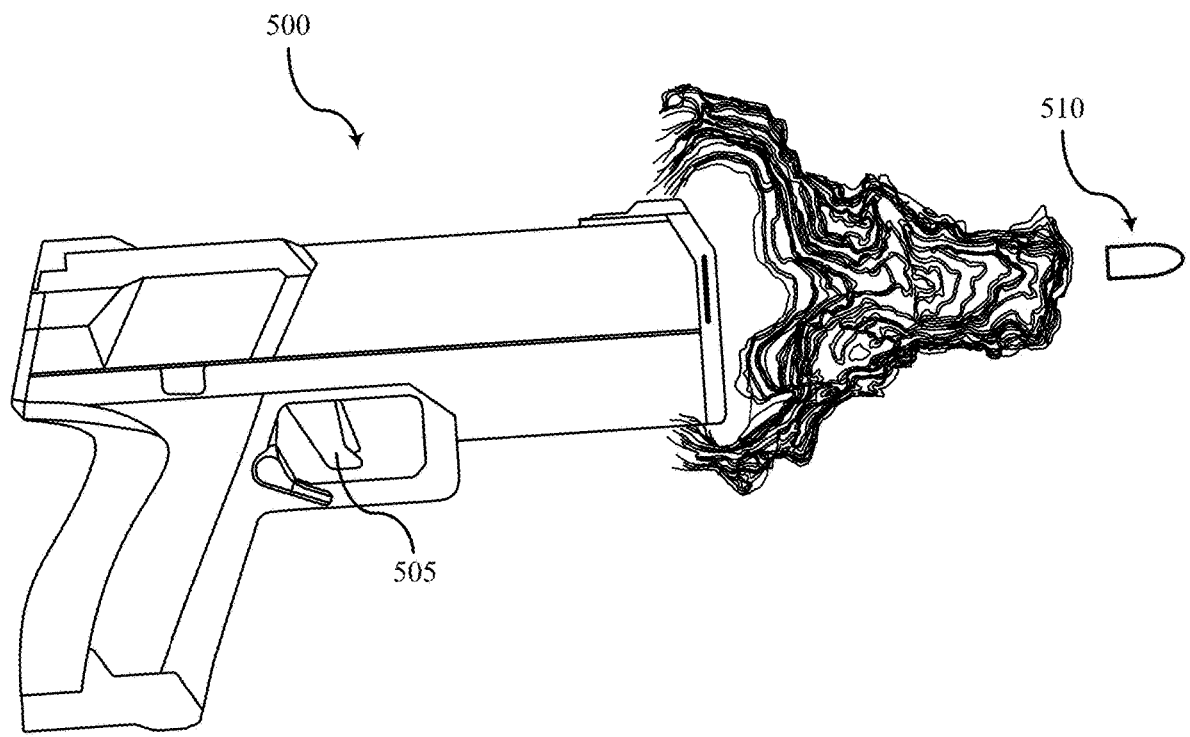
FIG. 5 illustrates examples of a gun firing a projectile.

FIG. 5 illustrates an example of a gun 500 that is firing a projectile 510. The firing of the projectile is an example of an action (also referred to as a "gun action") that may be performed by the gun 500 in response to receiving and/or decoding a message. Additional examples of gun actions include discharging electric charge from a capacitor bank, charging the capacitor bank, releasing a sear, arming the gun 500, disarming the gun 500, and transmitting data across a communication channel (e.g., a physical communication channel or a wireless communication channel).

The gun 500 may include a first electronic component and a second electronic component that exchange messages over a communication channel. The first electronic component may be referred to as a transmitter or spreader when transmitting a message and the first electronic component may be referred to as a receiver or de-spreader when receiving a message. The second electronic component may be referred to as a transmitter or spreader when transmitting a message and the second electronic component may be referred to as a receiver or de-spreader when receiving a message.

The first electronic component may transmit an encoded message to a second component, and the second electronic component may decode the encoded message to produce an unencoded version of the message. In response to decoding the encoded message, the gun 500 may perform an action, such as firing the projectile 510 (e.g., a bullet) through a barrel of the gun 500. For example, a user may pull the trigger 505 such that a trigger break condition is satisfied and the first electronic component may transmit an encoded message to the second electronic component based on the trigger break condition being satisfied. In response to receiving and/or decoding the encoded message, the gun 500 may perform an action, such as directing electric charge from a capacitor bank through a solenoid or a piezo-electric element. Directing electric charge through the solenoid or piezo-electric element may cause displacement of one or more actuators, thereby releasing a sear and causing the projectile 510 to be fired from the gun 500.

In some examples, the gun 500 may transition from one state to another state in response to receiving and/or decoding a message. Transitioning from one state to another state is an example of a gun action. For example, an encoded message may be transmitted based on a user picking up the gun 500 and/or the gun 500 performing an authentication procedure, and the gun 500 may transition to an armed state (e.g., a state that allows the gun being fired, a hardware or software configuration that allows the gun to be fired, an electrical circuit that supports firing the gun, etc.) based on receiving and/or decoding the message. The authentication procedure may include receiving authentication data from a user and determining that the user is authorized to operate the gun 500. As another example, an encoded message may be transmitted based on a user putting down or releasing the gun 500, and the gun 500 may transition to a disarmed state (e.g., a state that prevents the gun from being fired, an inhibition blocking the trigger, a hardware or software configuration that prevents the gun from being fired, an electrical circuit that blocks firing the gun, etc.) based on receiving and/or decoding the message.

Figure 6:
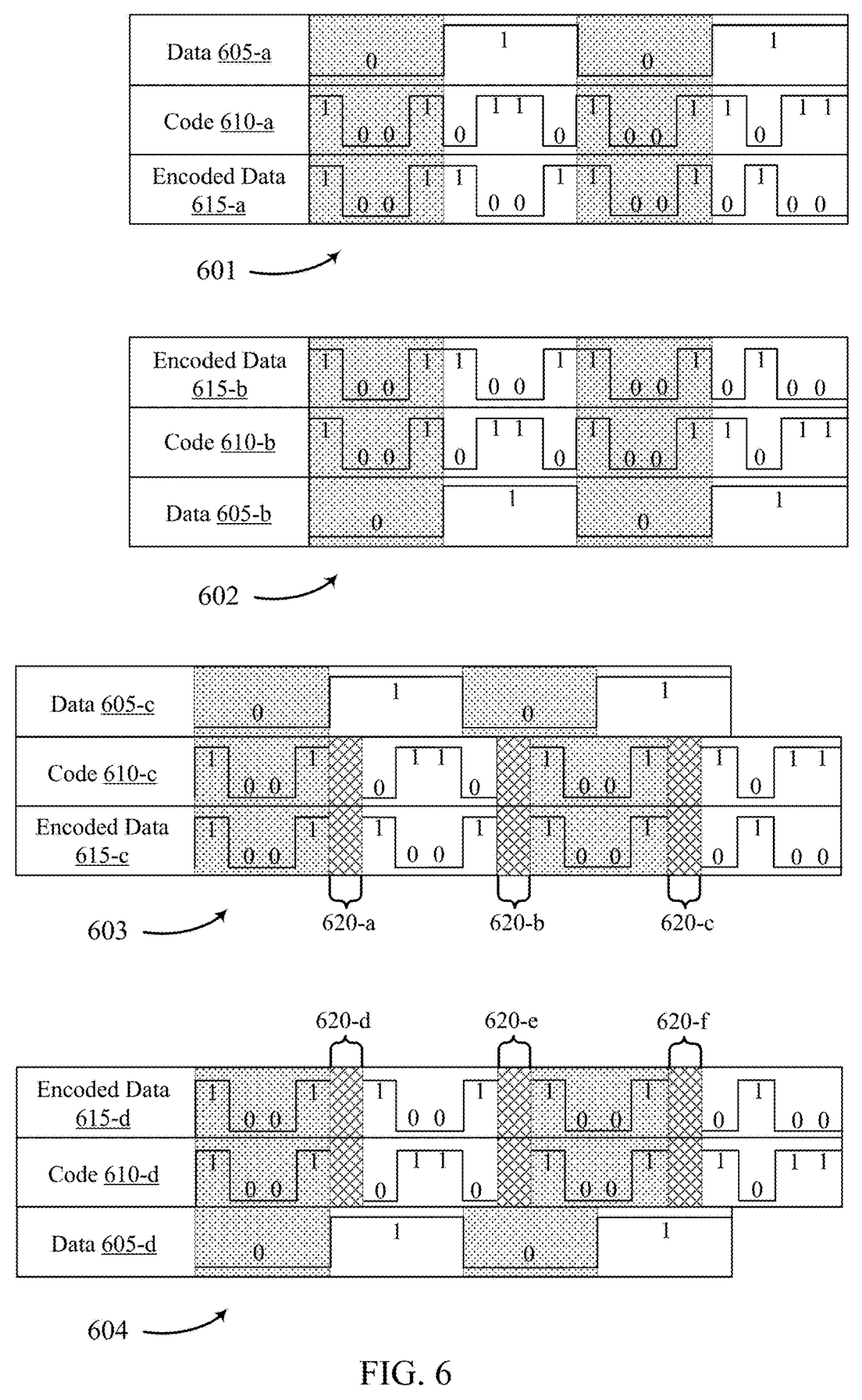

FIG. 6 illustrates examples of techniques for encoding and decoding messages. The encoding and decoding techniques illustrated in FIG. 6 are examples of techniques that may be implemented in a gun to improve the security of the gun and the data associated with the gun.

The message encoding technique 601 transforms the data 605-a (e.g., an unencoded message, an unencoded signal, a transparent message) into the encoded data 615-a (e.g., an encoded message or signal) according to the code 610-a (e.g., a spreading code, a key, etc.). The encoded data 615-a may be transmitted from a first electronic component (e.g., a transmitter, a first FPGA, a first ASIC, etc.) to a second electronic component (e.g., a receiver, a second FPGA, a second ASIC, etc.). The first electronic component may generate the encoded data 615-a based on a transformation function that takes the data 605-a and the code 610-a as input and produces the encoded data 615-a as output.

The message decoding technique 602 transforms the encoded data 615-b (e.g., an encoded message, an encoded signal, an opaque signal) into the data 605-b (e.g., an unencoded message) according to the code 610-b (e.g., a spreading code, a key, etc.). The second electronic component may generate the data 605-b based on a transformation function that takes the encoded data 615-b and the code 610-b as input and produces the data 605-b as output.

In other words, the first electronic component may encode the data 605-a by applying the XOR function to the data 605-a and the code 610-a to produce the encoded data 615-a, and the second electronic component may decode the encoded data 615-b by applying the XOR function to the encoded data 615-b and the code 610-b to produce the data 605-b.

The message encoding techniques 601 transforms (e.g., spreads or encodes) the data 605-a to produce the encoded data 615-a, and the message decoding technique 602 transforms the encoded data 615-b to produce the data 605-b. The data 605-b may be the same (or substantially the same) as the data 605-a. In other words, the message obtained at the receiver may be the same (or substantially the same) as the original message encoded at the transmitter. Two messages may be considered substantially the same when the difference between the two messages is less than an error threshold, such as a .01% error threshold, a 5% error threshold, or anywhere in between.

The transformation functions illustrated in FIG. 6 are the "exclusive OR" (XOR) function, but other transformation functions may be used to encode (e.g., spread) and decode (e.g., despread) messages. Examples of transformation functions include XOR, Salsa20, ChaCha, Speck, BLAKE, or the like. A gun may perform one or more actions based on the data 605-b. As an illustrative example, the gun may fire a projectile and/or discharge a capacitor bank based on a receiver (e.g., a second FPGA) decoding a message and identifying a known signal, such as the digital signal <0 1 0 1>.

The chip rate used in the message encoding technique 601 includes a chip rate of 4, thereby spreading the message by a factor of 4 (e.g., increasing signal bandwidth). The chip rate of 4 is a non-limiting example, and it should be understood that other chip rates may be used, such as 8, 10, 128, 512, 2048, etc.

The message encoding technique 603 transforms the data 605-c into the encoded data 615-c according to the code 610-c and a group of time offsets (e.g., time offset 620-a, time offset 620-b, and time offset 620-c). The time offset 620-a, the time offset 620-b, and the time offset 620-c correspond to the amount of time between transmissions of the encoded data 615-c by a transmitter. The time offset 620-d, the time offset 620-e, and the time offset 620-f correspond to the amount of time between receptions of the encoded data 615-d at the receiver. The encoded data 615-d may be decoded by the receiver according to the code 610-d to produce the data 605-d. It should be understood that time offsets may be used between messages or between portions of messages.

In some examples, the time offsets may be the same, while in some other examples, the time offsets may be different. For example, as shown in the message encoding technique 603 and the message decoding technique 604, the time offset 620-a and the time offset 620-d may correspond to a first time offset (e.g., a random or pseudo random time offset), the time offset 620-b and the time offset 620-e may correspond to a second time offset (e.g., a random or pseudo random time offset), and the time offset 620-c and the time offset 620-f may correspond to a third time offset (e.g., a random or pseudo random time offset). The time offsets may be the same duration of time, or the time offsets may be different durations of time. A gun may perform a gun action based on the data 605-d and/or based on the time offsets associated with receiving the encoded data 615-*d*. For example, a receiver may obtain the code 610-*d* and a set of time offsets (e.g., the time offset 620-*d*, the time offset 620-*e*, and the time offset 620-*f*), decode the encoded data 615-*d* based on the code 610-*d* and the time offsets to produce the data 605-*d*, and perform a gun action in response to producing the data 605-*d*.

Figure 7:
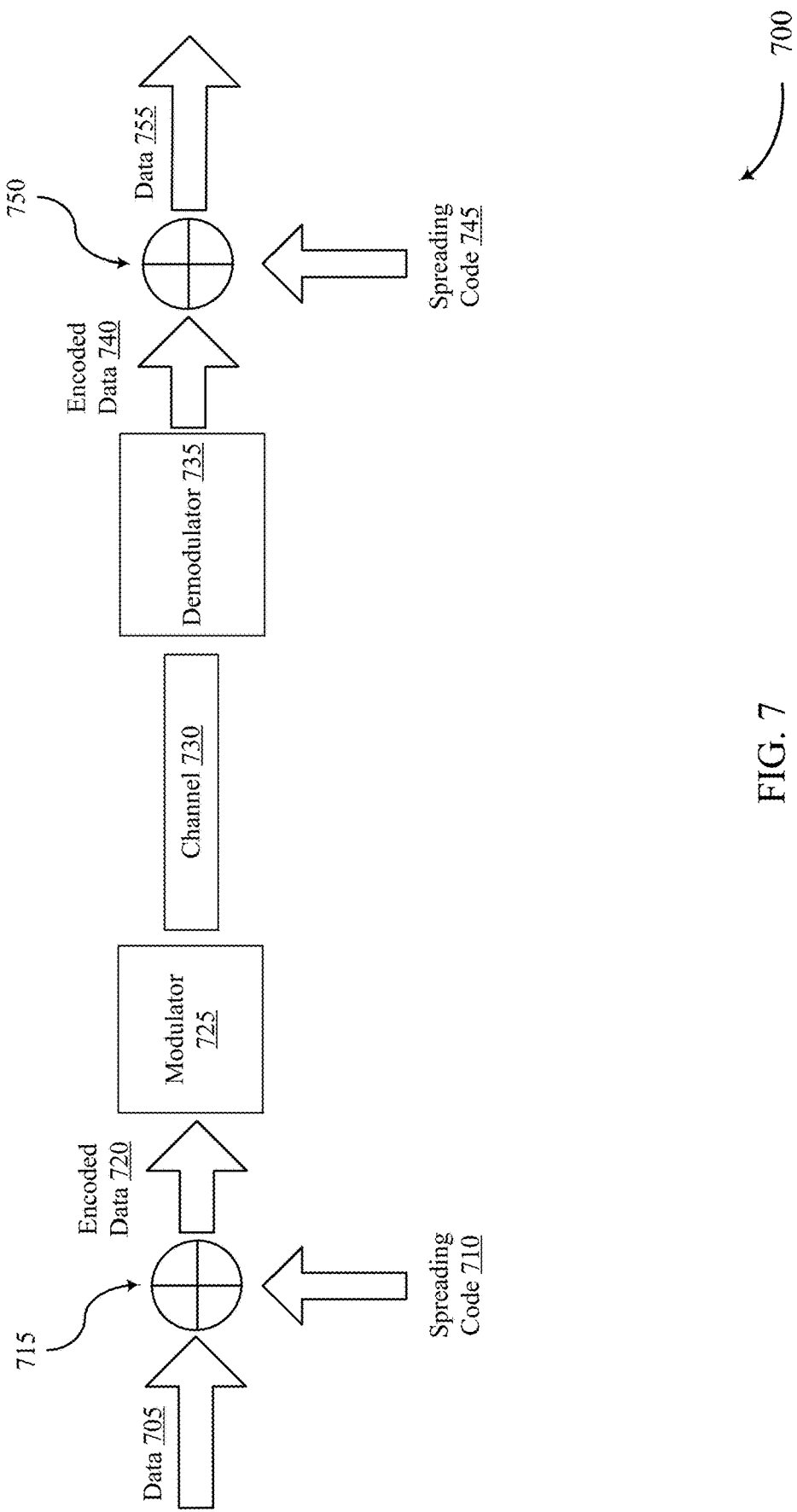
FIG. 7 illustrates an example of a communication scheme.

FIG. 7 illustrates an example of a communication scheme 700. Aspects of the communication scheme 700 may be implemented in a gun to improve the security of the gun.

A first electronic component (e.g., a transmitter, a mask component, an FPGA, etc.) may encode the data 705 according to a spreading code 710. The first component may apply a transformation function 715 to the data 705 according to the spreading code 710 to produce the encoded data 720. For example, the first component may apply the XOR transformation function 715 to the data 705 according to the spreading code 710 to produce the encoded data 720. The encoded data 720 may have a wider bandwidth than the data 705. The bandwidth of the encoded data 720 may be proportional to the number of encoding bits used to encode a data bit (e.g., the chip rate). Messages may be encoded according to a high chip rate (e.g., a chip rate above a threshold, such as 10, 16, 32, 64, 128, 512, 2048, or 4096 bits), thereby encoding messages across a wider bandwidth and improving message security. The transformation function may, in some examples, include add-rotate-XOR (ARX) operations.

The modulator 725 may modulate the encoded data 720 onto the channel 730. The channel 730 may be a physical communication channel or a wireless communication channel, and the modulator 725 may perform a digital to analog conversion, such as amplitude shift keying, binary phase shift keying, quadrature phase shift keying, frequency shift keying, or the like. The first electronic component may include the modulator 725 or the first electronic component may be electronically coupled with the modulator 725.

The demodulator 735 may be an aspect of, or coupled with, a second electronic component that receives encoded data via the channel 730. The demodulator 735 may perform an analog to digital conversion of signals received over the channel 730 to produce the encoded data 740. The second electronic component may apply the XOR transformation function 750 to the encoded data 740 according to the spreading code 745 to produce the data 755. The encoded data 740 is de-spread into the data 755, and the data 755 corresponds to the data 705. The second electronic component may perform an error correction procedure to improve the reliability of the communication scheme 700.

The spreading code 710 and the spreading code 745 may include one or more spreading codes. As an example, a spreading code may include a binary sequence with small cross-correlation (e.g., a Gold code) or a cryptographic binary sequence (e.g., a stream cipher). In some examples, portions of a message may be encoded and transmitted from a first electronic component to a second electronic component according to time offsets that temporally separate the portions of the message. Additionally, a first message may be encoded according to a first spreading code and/or a first time offset, and a second message may be encoded according to a second spreading code and/or a second time offset. In other words, different messages may be encoded in different manners. Such dynamic operations improve device security and mitigate signal spoofing.

Figure 8:
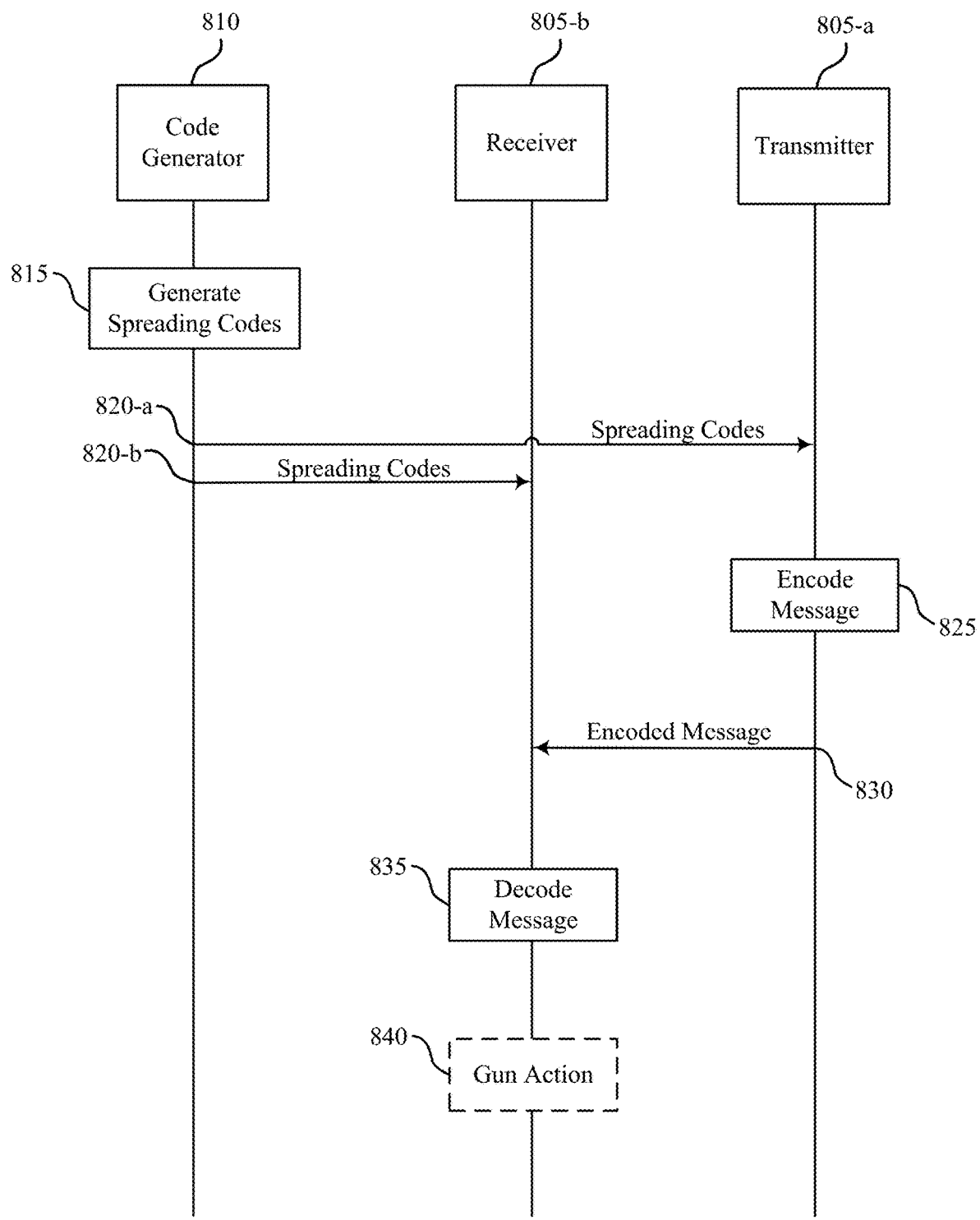
FIG. 8 illustrates an example of a process flow for communicating between a transmitter and a receiver.

FIG. 8 illustrates an example of a process flow 800 for communicating between a transmitter 805-*a* (e.g., an FPGA, an ASIC, a DSP, a processor, etc.) and a receiver 805-*b* (e.g., an FPGA, an ASIC, a DSP, a processor, etc.). The transmitter 805-*a* may transmit an encoded message to the receiver 805-*b*. In some examples, the transmitter 805-*a* and the receiver 805-*b* may be electronic components of a gun. The code generator may generate codes that can be used to encode data. The transmitter 805-*a* and the receiver 805-*b* may both be electronically coupled with the code generator 810, or the transmitter 805-*a* may include a first code generator and the receiver 805-*b* may include a second code generator.

At step 815, a spreading code is generated. In some examples, the spreading code may be generated based on a random or pseudorandom seed value. At step 820-*a*, the transmitter 805-*a* obtains the spreading code, and at step 820-*b*, the receiver 805-*b* obtains the spreading code.

In some examples, the code generator 810 may generate the spreading code and transmit the spreading code to the transmitter 805-*a* and the receiver 805-*b*, while in some other examples, the transmitter 805-*a* and the receiver 805-*b* may each independently generate the spreading code. For example, the code generator 810 may transmit a seed to the transmitter 805-*a* and the receiver 805-*b* such that both the transmitter 805-*a* and the receiver 805-*b* can generate the spreading code based on the seed and a deterministic function. In some examples, the transmitter 805-*a* and the receiver 805-*b* may both already have the seed stored in local memory. As another example, the transmitter 805-*a* and the receiver 805-*b* may be coupled with shared memory, and the transmitter 805-*a* and the receiver 805-*b* may retrieve the spreading code from the shared memory. As another example, the spreading code may be transmitted to the transmitter 805-*a* and the receiver 805-*b* in encrypted form (e.g., according to a public key in an asymmetric encryption scheme or according to a private key in a symmetric encryption scheme). As yet another example, the receiver 805-*b* may perform a spreading code synchronization procedure, such as a parallel search, a serial search, or a hybrid search, to determine the spreading code used by the transmitter 805-*a*.

At step 825, the transmitter 805-*a* may encode a message (e.g., a fire signal, an arming signal, a trigger signal, etc.) according to a first spreading code. At step 830, the transmitter 805-*a* may transmit the encoded message to the receiver 805-*b*. In some examples, the encoded message may be transmitted via a physical communication channel (e.g., a bus), while in other examples, the encoded message may be transmitted via a wireless communication channel (e.g., a radio frequency band, a frequency region, etc.).

At step 835, the receiver 805-*b* may decode the encoded message according to the first spreading code. The spreading code used by the receiver 805-*b* to decode the encoded message may correspond to the same spreading code used by the transmitter 805-*a* to encode the message.

At step 840, the receiver 805-*b* may perform an action in response to receiving and/or decoding the encoded message. For example, the receiver 805-*b* may discharge (or cause the discharge of) electric current from a capacitor bank in response to receiving the encoded message, and the gun may fire a projectile based on the electric charge being discharged from the capacitor bank. As another example, the receiver 805-*b* may cause the gun to transition into an armed state in response to decoding the encoded message. The armed state may provide a means for firing a projectile, or the armed state may cause a firing system inhibitor (e.g., a safety) to be disengaged such that the gun is capable of firing the projectile.

Figure 9:
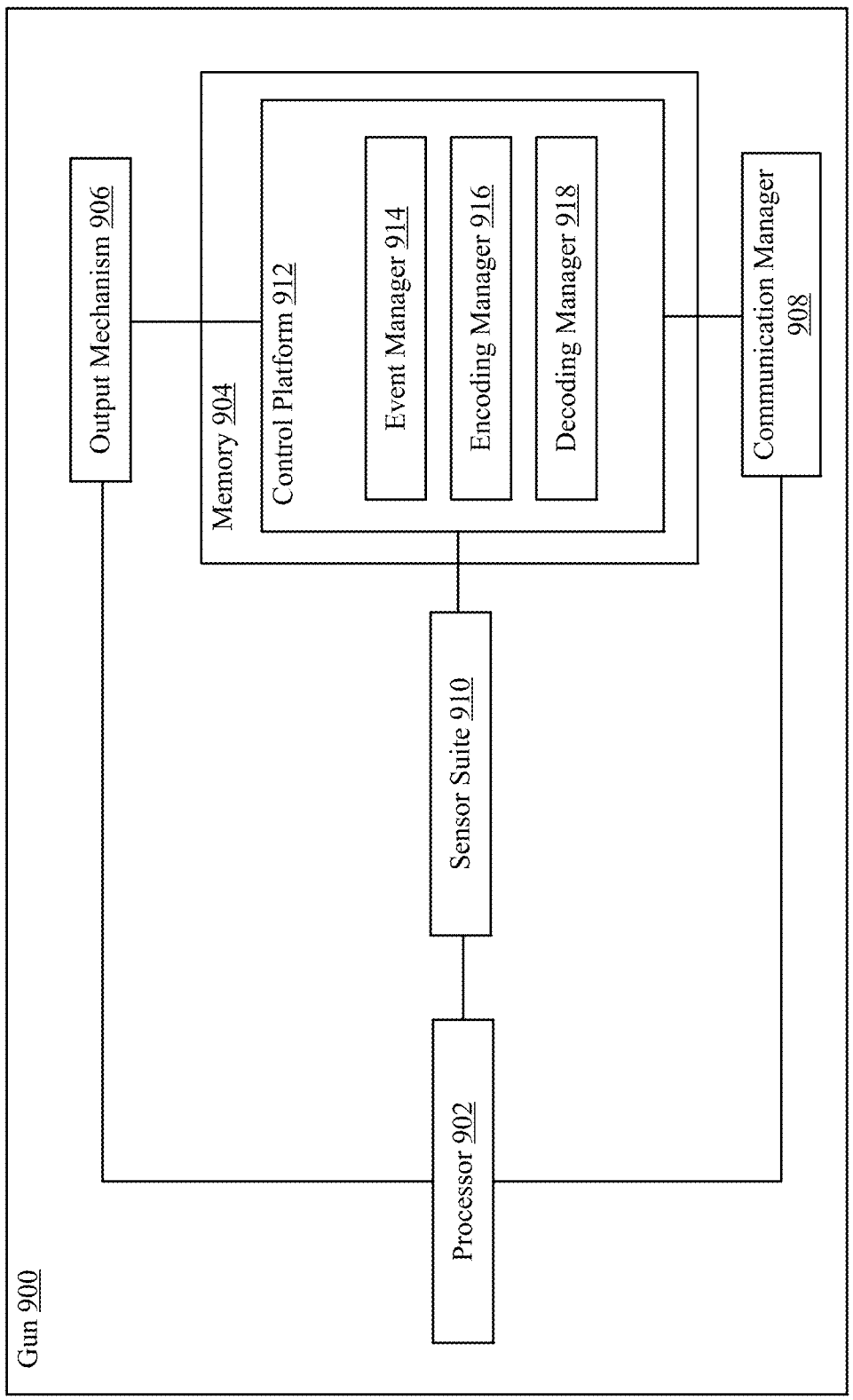
FIG. 9 illustrates an example of a gun that supports encoding and decoding messages.

FIG. 9 illustrates an example of a gun 900 able to implement a control platform 912 designed to produce outputs that are helpful in operating the gun 900. As further discussed below, the control platform 912 (also referred to as a "management platform" or a "communication manager") may be designed to identify gun events, encode messages, decode messages, or cause gun actions to be performed.

In some embodiments, the control platform 912 is embodied as a computer program that is executed by the gun 900. In other embodiments, the control platform 912 is embodied as an electrical circuit that performs logical operations of the gun 900. In yet other embodiments, the control platform 912 is embodied as a computer program that is executed by a computing device to which the gun 900 is communicatively connected. In such embodiments, the gun 900 may transmit relevant information to the computing device for processing as further discussed below. Those skilled in the art will recognize that aspects of the computer program could also be distributed amongst the gun 900 and computing device.

The gun 900 can include a processor 902, memory 904, output mechanism 906, and communication manager 908. The processor 902 can have generic characteristics similar to general-purpose processors, or the processor 902 may be an ASIC that provides control functions to the gun 900. As shown in FIG. 9, the processor 902 can be coupled with all components of the gun 900, either directly or indirectly, for communication purposes.

The memory 904 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 902, the memory 904 can also store data generated by the processor 902 (e.g., when executing the managers of the control platform 912). Note that the memory 904 is merely an abstract representation of a storage environment. The memory 904 could be comprised of actual memory chips or managers.

The output mechanism 906 can be any component that is capable of conveying information to a user of the gun 900. For example, the output mechanism 906 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 900. Thus, the display may indicate whether the gun 900 is presently in a locked state, unlocked state, etc. As another example, the output mechanism 906 may be a loudspeaker (or simply "speaker") that is able to audibly convey information to the user.

The communication manager 908 may be responsible for managing communications between the components of the gun 900. Additionally or alternatively, the communication manager 908 may be responsible for managing communications with computing devices that are external to the gun 900. Examples of computing devices include mobile phones, tablet computers, wearable electronic devices (e.g., fitness trackers), and network-accessible server systems comprised of computer servers. Accordingly, the communication manager 908 may be wireless communication circuitry that is able to establish communication channels with computing devices. Examples of wireless communication circuitry include integrated circuits (also referred to as "chips") configured for Bluetooth, Wi-Fi®, NFC, and the like.

Sensors are normally implemented in the gun 900. Collectively, these sensors may be referred to as the "sensor suite" 910 of the gun 900. For example, the gun 900 may include a motion sensor whose output is indicative of motion of the gun 900 as a whole. Examples of motion sensors include multi-axis accelerometers and gyroscopes. As another example, the gun 900 may include a proximity sensor whose output is indicative of proximity of the gun 900 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the gun 900 may include a fingerprint sensor or camera that generates images which can be used for, for example, biometric authentication. As shown in FIG. 9, outputs produced by the sensor suite 910 may be provided to the control platform 912 for examination or analysis.

For convenience, the control platform 912 may be referred to as a computer program that resides in the memory 904. However, the control platform 912 could be comprised of software, firmware, or hardware components that are implemented in, or accessible to, the gun 900. In accordance with embodiments described herein, the control platform 912 may include an event manager 914, an encoding manager 916, and a decoding manager 918. As an illustrative example, the event manager 914 may process data generated by, and obtained from, a time-of-flight sensor, the encoding manager 916 may encode data according to a spreading code to produce encoded data, and the decoding manager 918 may decode data according to a spreading code to produce unencoded data. Because the data obtained by these managers may have different formats, structures, and content, the instructions executed by these managers can (and often will) be different. For example, the instructions executed by the event manager 914 to process data generated by a time-of-flight sensor to determine whether a user is grasping the gun 900 may be different than the instructions generated by the decoding manager 918 to decode encoded data to produce unencoded data. As a specific example, the decoding manager 918 may implement error correcting algorithms (e.g., to reduce noise) that are not necessary for processing data generated by a time-of-flight sensor.

Figure 10:
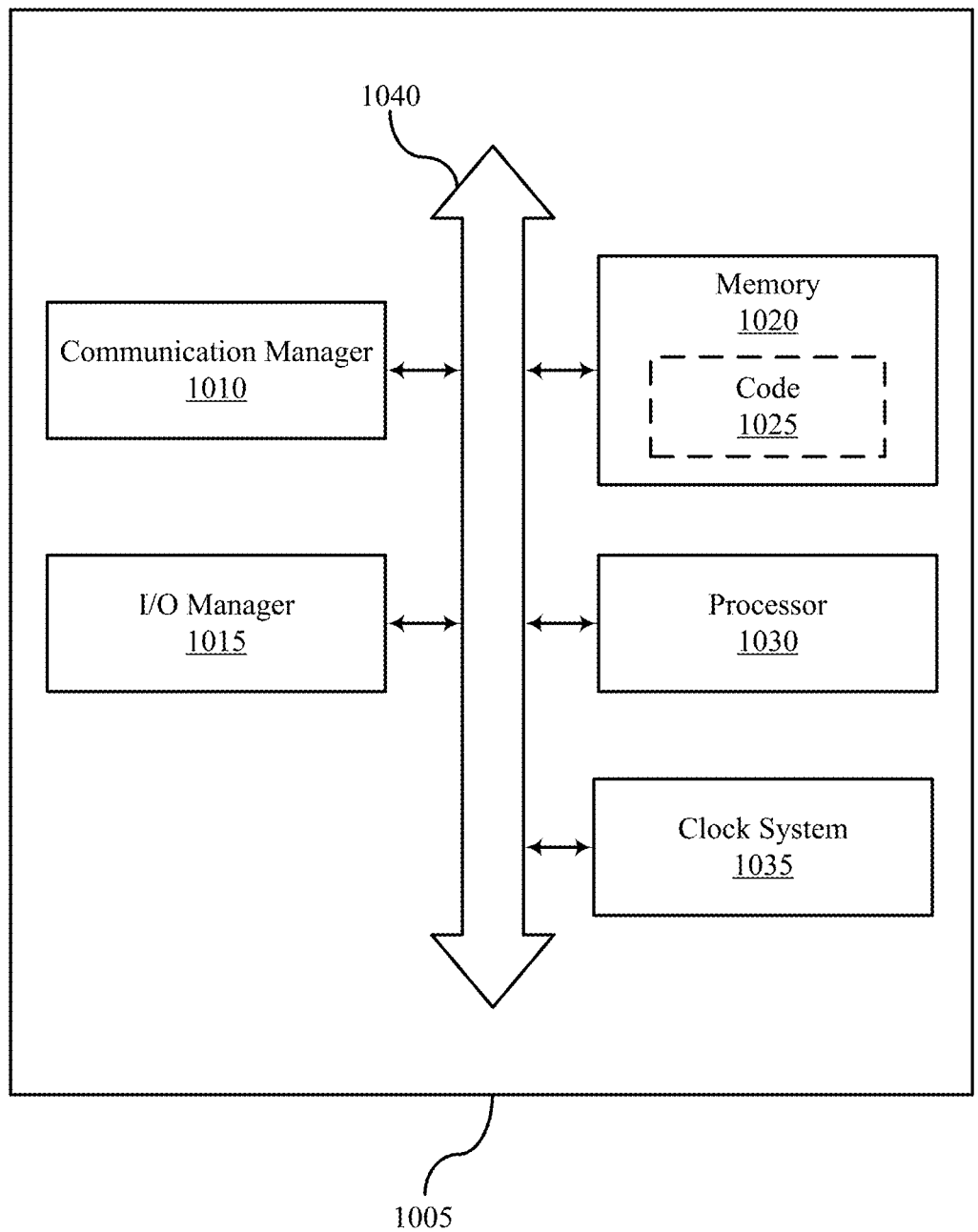
FIG. 10 illustrates an example of a system that supports encoding and decoding messages.

FIG. 10 illustrates an example of a system 1000 that supports encoding messages. The device 1005 may be operable to implement the techniques, technology, or systems disclosed herein. The device 1005 may include components such as a communication manager 1010, an input/output (I/O) manager 1015, memory 1020, code 1025, a processor 1030, a clock system 1035, and a bus 1040. The components of the device 1005 may communicate via one or more buses 1040. The device 1005 may be an example of, or include components of, a weapon or a gun.

The communication manager 1010 may generate a spreading code in accordance with a code generation scheme, store the spreading code in first memory of a first field-programmable gate array and second memory of a second field-programmable gate array, identify an event that is indicative of (i) trigger movement exceeding a predetermined amount, (ii) presence of a user, (iii) authentication of the user, or (iv) a request for data from a processor of the gun, encode, by the first field-programmable gate array in response to the identifying the event, a message comprising a first number of bits according to the spreading code stored in the first memory of the first field programmable gate array to produce an encoded message, where the encoded message comprises a second number of bits that is larger than the first number of bits, cause, by the first field-programmable gate array, the encoded message to be transmitted across a physical communication channel to the second field-programmable gate array, decode, by the second field-programmable gate array, the encoded message according to the spreading code stored in the second memory of the second field-programmable gate array to produce the message, and discharge, in response to decoding the encoded message, electric charge from a capacitor bank, so as to cause a projectile to be fired through a barrel.

The communication manager 1010 may obtain a first spreading code, encode, at a first electronic component, a first message according to the first spreading code to produce a first encoded message, transmit the first encoded message from the first electronic component to a second electronic component across a physical communication channel, decode, at the second electronic component, the first encoded message according to the first spreading code, and perform, based on decoding the first encoded message, a first action. The first action may include discharging electric charge from a capacitor bank, charging the capacitor bank, firing a first projectile, arming the gun, disarming the gun, or transmitting first data across an additional communication channel.

The I/O manager 1015 may manage input and output signals for the device 1005. The I/O manager 1015 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 1020 may include or store code (e.g., software) 1025. The memory 1020 may include volatile memory, such as random-access memory (RAM) and/or non-volatile memory, such as read-only memory (ROM). The code 1025 may be computer-readable and computer-executable, and when executed, the code 1025 may cause the processor 1030 to perform various operations or functions described here.

The processor 1030 may be an example or component of a central processing unit (CPU), an application specific integrated circuit (ASIC), or a field programmable gate array (FPGA). In some embodiments, the processor 1030 may utilize an operating system or software such as Microsoft Windows®, iOS®, Android®, Linux®, Unix®, or the like. The clock system 1035 control a timer for use by the disclosed embodiments.

The communication manager 1010, or its sub-components, may be implemented in hardware, software (e.g., software or firmware) executed by a processor, or a combination thereof. The communication manager 1010, or its sub-components, may be physically located in various positions. For example, in some cases, the communication manager 1010, or its sub-components may be distributed such that portions of functions are implemented at different physical locations by one or more physical components.

Figure 11:
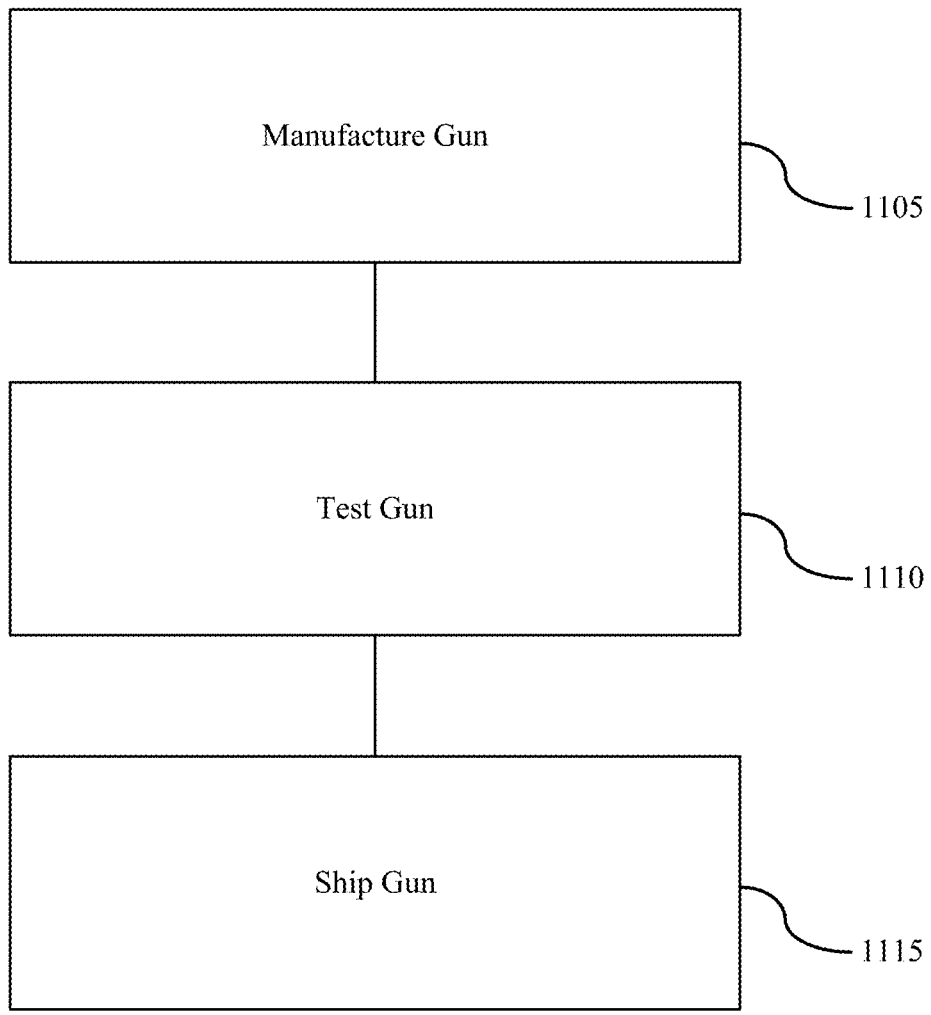
FIG. 11 illustrates an example of a flowchart showing a method of manufacturing a gun.

FIG. 11 illustrates an example of a flowchart 1100 showing a method of manufacturing a gun. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1105). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun). The manufacturer or another entity may generate, store, deploy, or otherwise manage cryptographic data associated with a gun. For example, the manufacturer may deploy a cryptographic secret (e.g., a cryptographic key for symmetric cryptographic procedures) into a memory component of the gun to support encryption and decryption at the gun, the manufacturer may deploy a public key into the memory component of the gun to support verifying cryptographic signatures, or the manufacturer may deploy a digital certificate into the memory component of the gun to demonstrate that the signature was created based on the private key associated with the public key, thereby suggesting the authenticity of the public key.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1110). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the barrel to verify that it meets a precision threshold and the cartridge feed system to verify that it meets a reliability threshold. As another example, the manufacturer may test a communication scheme implemented by electronic components of the gun. The manufacturer may verify the multiple aspects of the communication scheme, such as the security, reliability, and speed of the communication scheme. As yet another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Thereafter, the manufacturer may ship the gun to a dealer (step 1115). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1105 and 1110 either sequentially or simultaneously (e.g., one component may be tested while another component is added to the gun). Thus, the descriptions of these processes are intended to be open ended.

Figure 12:
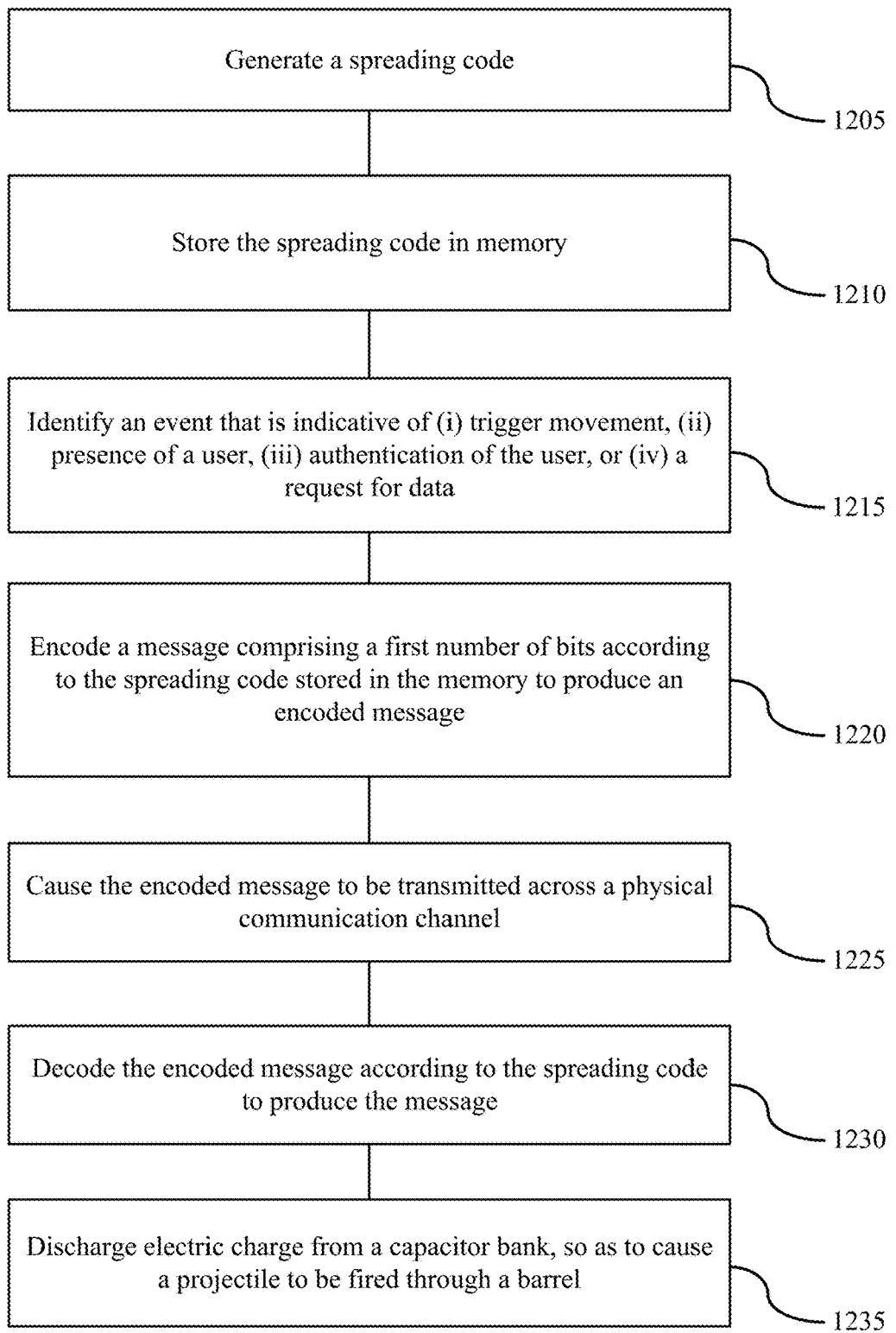
FIG. 12 illustrates an example of a flowchart showing a method performed by electronic components of a gun.

FIG. 12 shows a flowchart illustrating a method 1200 of encoding a fire control message in a gun. The operations of the method 1200 may be implemented by a gun or its components as described herein. For example, the operations of the method 1200 may be performed by a gun that includes a transmitter, a receiver, a communication manager, a controller, or a processor. In some examples, a processor (or a controller or a communication manager) may execute a set of instructions to control the functional elements of the gun to perform the described functions. Additionally or alternatively, the gun may perform aspects of the described functions using special-purpose hardware.

At step 1205, the gun may generate a spreading code in accordance with a code generation scheme. In some examples, the spreading code may be generated based on entropy data collected by the gun. The entropy data may be generated based on temperature measurements of components of the gun, user-input collected by the gun, movement data collected by a sensor (e.g., an IMU) of the gun, or the like.

At step 1210, the gun may store the spreading code in first memory of a first field-programmable gate array and second memory of a second field-programmable gate array. In some examples, the first field-programmable gate array may derive the spreading code and store the spreading code in first memory. The first memory may be tightly coupled with the first field-programmable gate array. In some examples, the second field-programmable gate array may derive the spreading code and store the spreading code in second memory. The second memory may be tightly coupled with the second field-programmable gate array.

At step 1215, the gun may identify an event that is indicative of (i) trigger movement exceeding a predetermined amount, (ii) presence of a user, (iii) authentication of the user, or (iv) a request for data from a processor of the gun. The event (e.g., a gun event) may be identified by a processor, a presence sensor, an FPGA, an ASIC, a DSP, or the like.

At step 1220 the gun may encode, by the first field-programmable gate array in response to the identifying the event, a message comprising a first number of bits according to the spreading code stored in the first memory of the first field programmable gate array to produce an encoded message, wherein the encoded message comprises a second number of bits that is larger than the first number of bits.

At step 1225, the gun may cause, by the first field-programmable gate array, the encoded message to be transmitted across a physical communication channel to the second field-programmable gate array.

At step 1230, the gun may decode, by the second field-programmable gate array, the encoded message according to the spreading code stored in the second memory of the second field-programmable gate array to produce the message.

At step 1235, the gun may discharge, in response to decoding the encoded message, electric charge from a capacitor bank, so as to cause a projectile to be fired through a barrel. In some examples, the gun may person a gun action in response to receiving and/or decoding the encoded message. For example, in response to receiving and/or decoding the encoded message, the gun may transition to a locked state, transition to an unlocked state, charge a capacitor bank, discharge a capacitor bank, fire a projectile, display data on a user interface or display panel, or the like.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
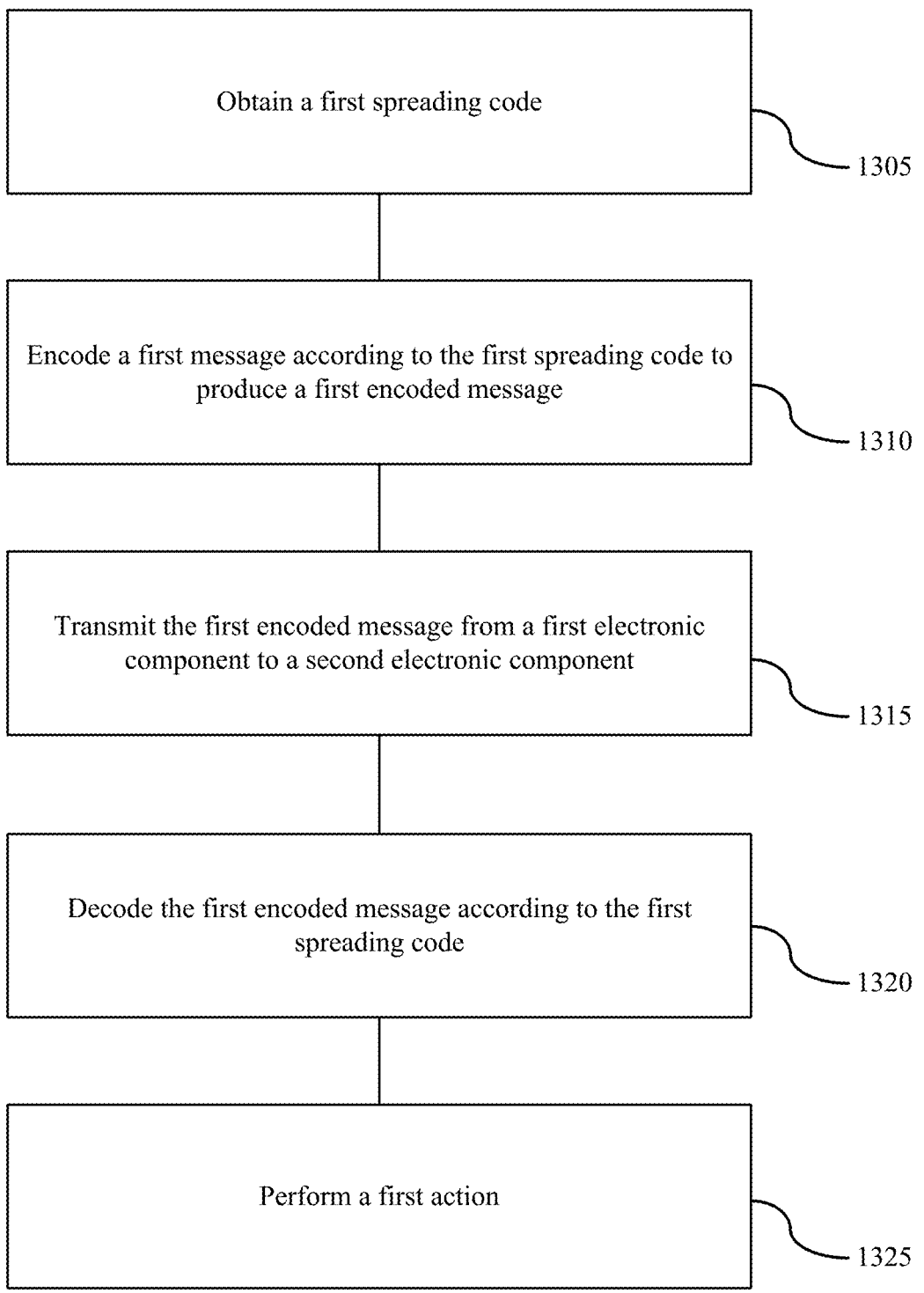
FIG. 13 illustrates an example of a flowchart showing a method of communicating across electronic components.

FIG. 13 shows a flowchart illustrating a method 1300 of encoding a message in a gun. The operations of the method 1300 may be implemented by a gun or its components as described herein. For example, the operations of the method 1300 may be performed by a gun that includes a transmitter, a receiver, a communication manager, a controller, or a processor. In some examples, a processor (or a controller or a communication manager) may execute a set of instructions to control the functional elements of the gun to perform the described functions. Additionally or alternatively, the gun may perform aspects of the described functions using special-purpose hardware.

At step 1305, the gun may obtain a first spreading code. In some examples, a transmitter may obtain the spreading code by generating the spreading code or retrieving the spreading code from memory. As an example, the transmitter may perform a derivation function to derive the spreading code.

At step 1310, the gun may encode, at a first electronic component, a first message according to the first spreading code to produce a first encoded message. The first electronic component may include the transmitter. The first electronic component may apply a transformation function to the first message according to the spreading code to produce the first encoded message.

At step 1315, the gun may transmit the first encoded message from the first electronic component to a second electronic component across a physical communication channel. In some examples, the first electronic component may transmit the first encoded message to the second electronic component over a wireless communication channel.

At step 1320, the gun may decode, at the second electronic component, the first encoded message according to the first spreading code. The second electronic component may obtain the spreading code based on performing a synchronization procedure. Examples of synchronization procedures include slinging correlator, transmitted reference, sequential estimation, delay line matched filter, baseband matched filter, and the like.

At step 1325, the gun may perform, based on decoding the first encoded message, a first action, the first action comprising discharging electric charge from a capacitor bank, charging the capacitor bank, firing a first projectile, arming the gun, disarming the gun, or transmitting first data across an additional communication channel. In some examples, the gun may perform multiple gun actions in response to receiving and/or decoding the first encoded message.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 14:
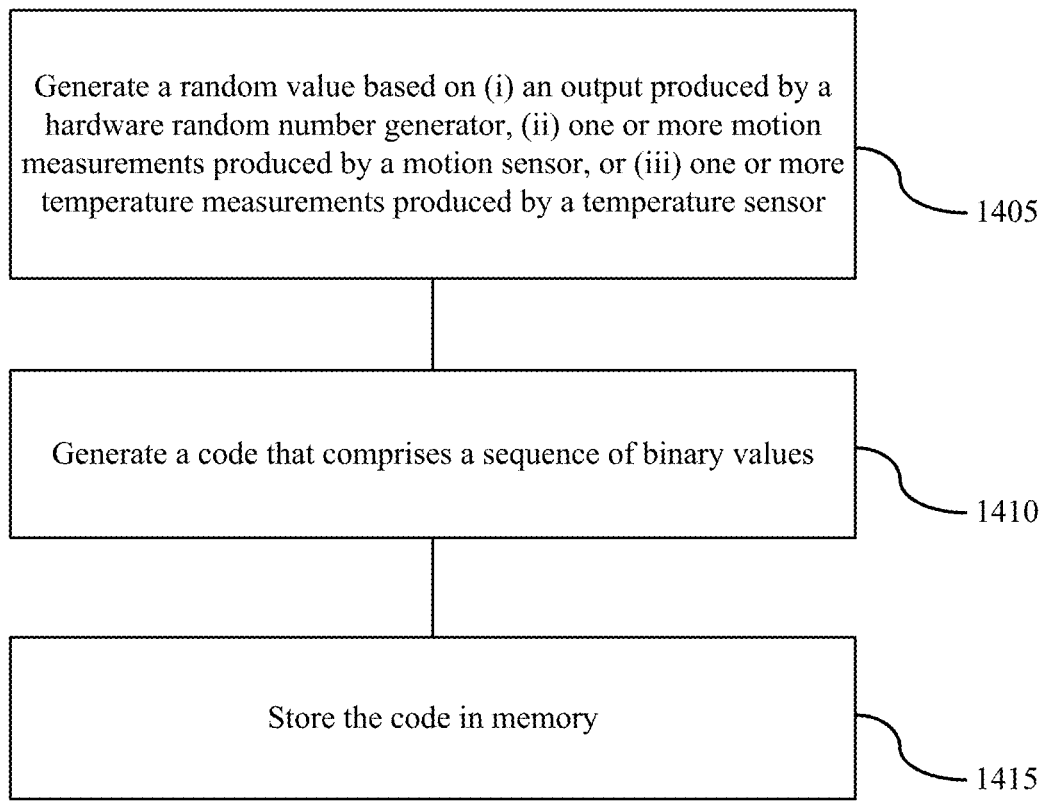
FIG. 14 illustrates an example of a flowchart showing a method of generating a spreading code.

FIG. 14 shows a flowchart illustrating a method 1400 of generating a spreading code. The operations of the method 1400 may be implemented by a gun or its components as described herein. For example, the operations of the method 1400 may be performed by a gun that includes a transmitter, a receiver, a communication manager, a controller, or a processor. In some examples, a processor (or a controller or a communication manager) may execute a set of instructions to control the functional elements of the gun to perform the described functions. Additionally or alternatively, the gun may perform aspects of the described functions using special-purpose hardware.

At step 1405, the gun may generate a random value based on (i) an output produced by a hardware random number generator coupled with the weapon, (ii) one or more motion measurements produced by a motion sensor coupled with the weapon, or (iii) one or more temperature measurements produced by a temperature sensor coupled with the weapon.

At step 1410, the gun may generate, based on the random value, a code that comprises a sequence of binary values.

At step 1415, the gun may store the code in memory coupled with the weapon. The gun may store the code in memory that is tightly coupled with an electronic component. In some examples, the code may be encrypted, and the encrypted version of the code may be stored in the memory.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method performed by electronic components of a gun for encoding a fire control message, the method including: generating a spreading code in accordance with a code generation scheme; storing the spreading code in first memory of a first field-programmable gate array and second memory of a second field-programmable gate array; identifying an event that is indicative of (i) trigger movement exceeding a predetermined amount, (ii) presence of a user, (iii) authentication of the user, or (iv) a request for data from a processor of the gun; encoding, by the first field-programmable gate array in response to the identifying the event, a message including a first number of bits according to the spreading code stored in the first memory of the first field programmable gate array to produce an encoded message, wherein the encoded message includes a second number of bits that is larger than the first number of bits; causing, by the first field-programmable gate array, the encoded message to be transmitted across a physical communication channel to the second field-programmable gate array; decoding, by the second field-programmable gate array, the encoded message according to the spreading code stored in the second memory of the second field-programmable gate array to produce the message; and discharging, in response to decoding the encoded message, electric charge from a capacitor bank, so as to cause a projectile to be fired through a barrel.

In some examples, the techniques described herein relate to a method of communicating across electronic components of a gun, the method including: obtaining a first spreading code; encoding, at a first electronic component, a first message according to the first spreading code to produce a first encoded message; transmitting the first encoded message from the first electronic component to a second electronic component across a physical communication channel; decoding, at the second electronic component, the first encoded message according to the first spreading code; and performing, based on decoding the first encoded message, a first action, the first action including discharging electric charge from a capacitor bank, charging the capacitor bank, firing a first projectile, arming the gun, disarming the gun, or transmitting first data across an additional communication channel.

In some examples, the techniques described herein relate to a method, further including: identifying a first gun event, wherein transmitting the first encoded message is based on the first gun event. In some examples, the techniques described herein relate to a method, further including: identifying a first gun event, wherein said transmitting could be performed responsive to identifying a gun event. For example, said transmitting may be performed in response to identifying the first gun event.

In some examples, the techniques described herein relate to a method, wherein the first gun event includes a trigger break.

In some examples, the techniques described herein relate to a method, wherein identifying the trigger break is based at least in apart on satisfying a trigger displacement threshold, satisfying a trigger force threshold, or both.

In some examples, the techniques described herein relate to a method, wherein the first gun event includes an authentication procedure in which an identity of a user is authenticated.

In some examples, the techniques described herein relate to a method, further including: receiving first biometric data associated with a user; and determining that the first biometric data matches second biometric data stored at the gun, wherein the authentication procedure includes determining that the first biometric data matches the second biometric data.

In some examples, the techniques described herein relate to a method, wherein the first gun event includes a user picking up the gun, the user putting down the gun, gun motion that corresponds to a gun pickup gesture, or expiration of a timer.

In some examples, the techniques described herein relate to a method, further including: storing the first spreading code in memory of the first electronic component and memory of the second electronic component.

In some examples, the techniques described herein relate to a method, wherein encoding the first message is based on the first spreading code stored in the memory of the first electronic component, and wherein decoding the first message is based on the first spreading code stored in the memory of the second electronic component.

In some examples, the techniques described herein relate to a method, further including: obtaining a random value, wherein generating the first spreading code is based on the random value.

In some examples, the techniques described herein relate to a method, wherein the random value is based on a hardware random number generator.

In some examples, the techniques described herein relate to a method, further including: collecting entropy information at the gun, wherein the random value is based on the entropy information.

In some examples, the techniques described herein relate to a method, wherein collecting the entropy information includes: measuring motion at the gun, measuring temperature of one or more components coupled with the gun, or both.

In some examples, the techniques described herein relate to a method, wherein the random value includes a sequence of binary values, wherein the first spreading code is based on the sequence of binary values.

In some examples, the techniques described herein relate to a method, wherein the first spreading code includes the sequence of binary values.

In some examples, the techniques described herein relate to a method, further including: performing a deterministic function that uses the random value as an input and generates a pseudo-random sequence of binary values as an output, wherein the first spreading code is based on the pseudo-random sequence of binary values.

In some examples, the techniques described herein relate to a method, wherein the first spreading code includes the pseudo-random sequence of binary values.

In some examples, the techniques described herein relate to a method, further including: obtaining a threshold number of spreading codes; and selecting, based on the random value, the first spreading code from the threshold number of spreading codes.

In some examples, the techniques described herein relate to a method, wherein the first spreading code includes a Maximum Length code, a Walsh-Hadamard code, a Gold code, or a Barker code.

In some examples, the techniques described herein relate to a method, wherein each spreading code of the first spreading code is less than a threshold spreading code size.

In some examples, the techniques described herein relate to a method, further including: obtaining a second spreading code that is different from the first spreading code. In some examples, the second spreading code may be obtained and/or generated in real-time or pseudo real time near real-time. For example, the second spreading code may be generated in response to a gun event, (e.g., a user presence, a user authentication, a user gesture, such as a user picking up the gun, etc. In some examples, the first spreading code may be generated in response to a gun event. For example, the first spreading code may be generated in response to a user picking up the gun, and the second spreading code may be generated in response to the user providing authentication data to the gun.

In some examples, the techniques described herein relate to a method, further including: encoding, at the first electronic component, a second message according to the second spreading code to produce a second encoded message; and transmitting, across the physical communication channel, the second encoded message.

In some examples, the techniques described herein relate to a method, further including: decoding, at the second electronic component coupled with the physical communication channel, the second encoded message according to the second spreading code; and performing, based on decoding the second encoded message, a second action at the gun, the second action including discharging additional electric charge from the capacitor bank, charging the capacitor bank, firing a second projectile, arming the gun, disarming the gun, or transmitting second data across the additional communication channel.

In some examples, the techniques described herein relate to a method, wherein the physical communication channel includes an Inter-Integrated Circuit ( ) communication channel, a Serial Peripheral Interface (SPI) communication channel, or a conductive wire.

In some examples, the techniques described herein relate to a method, wherein the first electronic component includes a first field-programmable gate array and wherein the second electronic component includes a second field-programmable gate array.

In some examples, the techniques described herein relate to a method, wherein the first spreading code is generated based on a set of shift registers coupled with the gun.

In some examples, the techniques described herein relate to a method, wherein the first encoded message includes more data than the first message.

In some examples, the techniques described herein relate to a method, further including: generating a time offset, wherein transmitting the first encoded message across the physical communication channel includes: transmitting a first portion of the first encoded message; and transmitting a second portion of the first encoded message according to the time offset. In some examples, an interval of time may be representative of the time offset. For example, a first portion of the encoded message may be transmitted from the first electronic component to the second electronic component, and then following expiration of the interval of time, the second portion of the encoded message may be transmitted from the first electronic component to the second electronic component. Expiration of the interval of time may result in a signal being generated (e.g., by a monitoring circuit to which a clock signal is provided as input), and this signal may be provided to the first electronic component to prompt, provoke, or otherwise cause transmission of the second portion of the encoded message.

In some examples, the techniques described herein relate to a method, wherein a time difference between transmitting the first portion of the first encoded message and transmitting the second portion of the first encoded messages corresponds to the time offset.

In some examples, the techniques described herein relate to a method, wherein the time offset is within an inclusive range of 1 microsecond and 200 microseconds.

In some examples, the techniques described herein relate to a method of generating a spreading code at a weapon, the method including: generating a random value based on (i) an output produced by a hardware random number generator coupled with the weapon, (ii) one or more motion measurements produced by a motion sensor coupled with the weapon, or (iii) one or more temperature measurements produced by a temperature sensor coupled with the weapon; generating, based on the random value, a code that includes a sequence of binary values; and storing the code in memory coupled with the weapon.

In some examples, the techniques described herein relate to a method, further including: encoding a message according to the code to produce an encoded message; transmitting the encoded message from a first electronic component to a second electronic component; and performing a weapon action based on transmitted the encoded message.

In some examples, the techniques described herein relate to a method, wherein the weapon action includes discharging electric charge from a capacitor bank, charging the capacitor bank, firing a projectile, arming the weapon, disarming the weapon, or transmitting data across a communication channel.

In some examples, the techniques described herein relate to a method performed by a gun for encoding a message, the method including: encoding, at a first electrical component, a message by applying a spreading code thereto, the spreading code being stored in memory of the first electrical component; causing the encoded message to be transmitted from the first electrical component to a second electrical component; decoding, at the second electrical component, the encoded message by applying the spreading code thereto, the spreading code being stored in memory of the second electrical component; and performing an action in response to the encoded message being successfully decoded at the second electrical component.

Remarks

The Detailed Description provided herein, in connection with the drawings, describes example configurations and does not represent all the examples that may be implemented or that are within the scope of the claims. The term "example" used herein means "serving as an illustration or instance," and not "a preferred example."

The functions described herein may be implemented with a controller. A controller may include a communication manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of generating a spreading code at a gun, the method comprising:
   generating a random value based on an input value that includes a temperature measurement produced by a temperature sensor of the gun, wherein the input value is used to seed a pseudorandom number generator, and wherein the random value is an output of the pseudorandom number generator;
   generating, at a first electronic component of the gun and based on the random value, a code that includes a sequence of binary values; and
   storing the code in memory of the first electronic component of the gun.

2. A method of generating a spreading code at a gun, the method comprising:
   generating a random value based on an input value that includes (i) an output produced by a hardware random number generator of the gun, (ii) one or more motion measurements produced by a motion sensor of the gun, or (iii) one or more temperature measurements produced by a temperature sensor of the gun;
   generating, at a first electronic component of the gun and based on the random value, a code that includes a sequence of binary values; and
   storing the code in memory of the first electronic component of the gun.

3. The method of claim 2, further comprising:
   performing, at a second electronic component of the gun, a synchronization procedure to determine the code.

4. The method of claim 2, further comprising:
   performing, at a second electronic component of the gun, a synchronization procedure to determine the code, wherein the synchronization procedure includes a parallel search procedure, a serial search procedure, or a hybrid search procedure.

5. The method of claim 2, further comprising:
   receiving, at a second electronic component of the gun, an encrypted version of the code; and
   decrypting, at the second electronic component, the encrypted version of the code to produce an unencrypted version of the code.

6. The method of claim 2, further comprising:
   encoding, at the first electronic component, a message according to the code to produce an encoded message;
   transmitting the encoded message from the first electronic component to a second electronic component;
   obtaining the code at the second electronic component; and
   decoding, at the second electronic component, the encoded message according to the code to produce the message in unencoded form.

7. The method of claim 6, further comprising:
   performing a gun action based on the decoding the encoded message, wherein the gun action includes discharging electric charge from a capacitor bank, charging the capacitor bank, firing a projectile, arming the gun, disarming the gun, or transmitting data across a communication channel.

8. The method of claim 6, wherein the transmitting the encoded message includes transmitting the encoded message across a physical communication channel.

9. The method of claim 6, wherein the transmitting the encoded message includes transmitting the encoded message across a virtual communication channel.

10. The method of claim 2, wherein the input value includes the output produced by the hardware random number generator of the gun.

11. The method of claim 2, wherein the input value includes the one or more motion measurements produced by the motion sensor of the gun.

12. The gun of claim 2, wherein the input value includes the one or more temperature measurements produced by the temperature sensor of the gun.

13. A method of generating a spreading code at a gun, the method comprising:
   generating a random value based on an input value that includes one or more motion measurements produced by a motion sensor of the gun;
   generating, at a first electronic component of the gun and based on the random value, a code that includes a sequence of binary values;
   storing the code in memory of the first electronic component of the gun;
   obtaining the code at a second electronic component of the gun; and
   storing the code in memory of the second electronic component of the gun.

14. The method of claim 13, wherein the obtaining the code at the second electronic component is based on:
   receiving the random value at the second electronic component; and
   generating, at the second electronic component, the code based on the random value.

15. The method of claim 13, further comprising:
   encoding, at the first electronic component, a message according to the code to produce an encoded message;
   transmitting the encoded message from the first electronic component to the second electronic component; and
   decoding, at the second electronic component, the encoded message according to the code to produce the message in encoded form.

16. The method of claim 15, further comprising:
   performing a gun action based on the decoding the encoded message, wherein the gun action includes discharging electric charge from a capacitor bank, charging the capacitor bank, firing a projectile, arming the gun, disarming the gun, or transmitting data across a communication channel.

* * * * *